(12) United States Patent
Ogawa

(10) Patent No.: US 10,375,061 B2
(45) Date of Patent: *Aug. 6, 2019

(54) COMMUNICATION APPARATUS, REMINDER APPARATUS, AND INFORMATION RECORDING MEDIUM

(71) Applicant: Hideharu Ogawa, Tokyo (JP)

(72) Inventor: Hideharu Ogawa, Tokyo (JP)

(73) Assignee: Hideharu Ogawa, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 15/619,034

(22) Filed: Jun. 9, 2017

(65) Prior Publication Data

US 2017/0279791 A1    Sep. 28, 2017

Related U.S. Application Data

(62) Division of application No. 13/820,075, filed as application No. PCT/JP2011/069600 on Aug. 30, 2011, now Pat. No. 9,705,874.

(30) Foreign Application Priority Data

Aug. 31, 2010 (JP) ................... 2010-194234

(51) Int. Cl.
*H04L 29/06* (2006.01)
*G06F 21/33* (2013.01)
(Continued)

(52) U.S. Cl.
CPC ............ *H04L 63/083* (2013.01); *G06F 21/31* (2013.01); *G06F 21/33* (2013.01); *G06F 21/42* (2013.01);
(Continued)

(58) Field of Classification Search
None
See application file for complete search history.

(56) References Cited

U.S. PATENT DOCUMENTS 5,428,349 A    6/1995  Baker
6,571,336 B1   5/2003  Smith, Jr.
(Continued)

FOREIGN PATENT DOCUMENTS

EP    1475721 A1    10/2004
JP    2002366517 A  12/2002
(Continued)

OTHER PUBLICATIONS

Conorich, Douglas G., "Effective Management of UNIX Passwords" IT Today, Apr. 23, 2008, 14 pages.
(Continued)

*Primary Examiner* — Samson B Lemma
*Assistant Examiner* — Carlos E Amorin
(74) *Attorney, Agent, or Firm* — K&L Gates LLP; Louis C. Cullman; Hal Gibson

(57) ABSTRACT

Provided is a communication apparatus (121) that securely manages passwords for utilizing a server apparatus. A generator (203) generates a random table having the same number of rows and the same number of columns as a password table associated with a server name specified in an authentication request received by a receiver (202). An acceptor (205) accepts a key from a user to whom the random table is presented by a presenter (204). An identification unit (206) identifies, from the key and the random table, the user's of selection order of elements in the table. An acquirer (207) selects and arranges elements in the password table in the identified selection order, thereby acquiring a password. An output unit (208) displays the acquired password on a display or transmits the acquired (Continued)

password to the server apparatus, thereby allowing the user to utilize the server apparatus.

6 Claims, 5 Drawing Sheets

(51) Int. Cl.
    *G06F 21/31*     (2013.01)
    *G06F 21/42*     (2013.01)
    *H04L 9/32*     (2006.01)

(52) U.S. Cl.
    CPC ........ *H04L 63/0846* (2013.01); *H04L 9/3271* (2013.01); *H04L 2463/061* (2013.01)

(56) References Cited

U.S. PATENT DOCUMENTS

| | | | |
|---|---|---|---|
| 7,036,016 | B1 | 4/2006 | Smith, Jr. |
| 7,363,503 | B2 | 4/2008 | Solioz |
| 8,577,807 | B2 | 11/2013 | Kokumai et al. |
| 2004/0139331 | A1 | 7/2004 | Sanai et al. |
| 2005/0160297 | A1 | 7/2005 | Ogawa |
| 2006/0041759 | A1 | 2/2006 | Kaliski, Jr. et al. |
| 2006/0248344 | A1 | 11/2006 | Yang |
| 2007/0089166 | A1 | 4/2007 | Medjitov |
| 2007/0094498 | A1 | 4/2007 | Nystrom et al. |
| 2007/0226784 | A1 | 9/2007 | Ueda et al. |
| 2008/0141362 | A1 | 6/2008 | Torres et al. |
| 2008/0276098 | A1 | 11/2008 | Florencio et al. |
| 2010/0107229 | A1 | 4/2010 | Najafi et al. |
| 2010/0223358 | A1 | 9/2010 | Schneider |
| 2011/0191592 | A1* | 8/2011 | Goertzen ................ G06F 21/36 713/182 |
| 2011/0202981 | A1* | 8/2011 | Tamai .................... G06F 21/10 726/6 |
| 2011/0277021 | A1 | 11/2011 | Ogawa |
| 2013/0312088 | A1 | 11/2013 | Zhang |
| 2015/0128234 | A1 | 5/2015 | Xavier et al. |

FOREIGN PATENT DOCUMENTS

| | | |
|---|---|---|
| JP | 2003-122721 | 4/2003 |
| JP | 2004-280245 | 10/2004 |
| JP | 2005-071202 | 3/2005 |
| JP | 2006-311529 | 11/2006 |
| JP | 2007108833 A | 4/2007 |
| JP | 2007-264839 A | 10/2007 |
| JP | 2008027222 A | 2/2008 |
| JP | 2008-192173 | 8/2008 |
| JP | 2008-234110 | 10/2008 |
| JP | 2009301446 A | 12/2009 |
| JP | 2011215753 A | 10/2011 |
| KR | 10-0496154 B1 | 6/2005 |
| KR | 20080062445 A | 7/2008 |
| WO | 200184359 | 11/2001 |
| WO | 2010079617 A1 | 7/2010 |
| WO | 2012029776 A1 | 3/2012 |
| WO | 2013070124 A1 | 5/2013 |

OTHER PUBLICATIONS

EP 11821792.6-1870 Extended Search Report, dated Oct. 19, 2016, 33 pages.
KR 10-2013-7008172 Notice of Allowance, original Korean and English language translation, 4 pages.
Sasaki et al., Notes on the security for one-time password system with password generator server, The 31st Symposium on Cryptography and Information Security, Kagoshima, Japan, Jan. 21-24, 2014, The Institute of Electronics, Information and Communication Engineers, SCIS 2014, 6 pages.
Extended European Search Report for European Patent Application No. 15840293.3 dated Mar. 12, 2018.
European Office Action dated Oct. 11, 2017 for European Patent Application No. 11821792.6.
U.S. Office Action dated Nov. 29, 2018, from U.S. Appl. No. 15/509,459, filed Mar. 7, 2017.

* cited by examiner

FIG. 3

|     |     | 301 |     |     |
|-----|-----|-----|-----|-----|
| Lmj | f2q | b9g | zYu | s1C |
| DoY | 6nj | h19 | w5b | a8i |
| nVE | 9d8 | vX5 | d6y | RA0 |
| Pp2 | 6zh | Azw | j5x | BL5 |
| MiG | Ikx | pz9 | 0UG | x33 |

302a → top-left row; 302b → a8i; 302c → Ikx

FIG. 4

|    |    | 401 |    |    |
|----|----|-----|----|----|
| 13 | 08 | 64  | 56 | 25 |
| 78 | 44 | 77  | 49 | 02 |
| 07 | 17 | 98  | 40 | 19 |
| 82 | 31 | 27  | 26 | 09 |
| 62 | 06 | 51  | 46 | 21 |

402a → top-left row; 402b → 02; 402c → 06

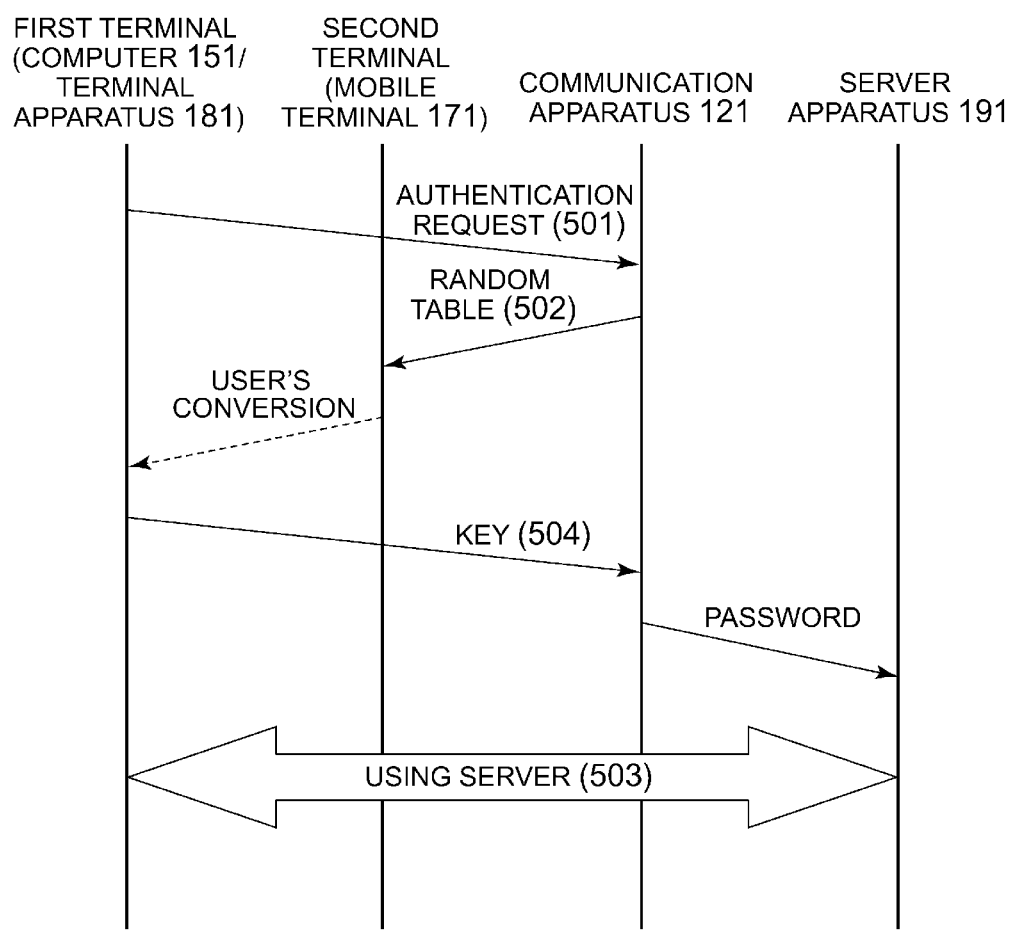

COMMUNICATION APPARATUS, REMINDER APPARATUS, AND INFORMATION RECORDING MEDIUM

TECHNICAL FIELD

The present invention relates generally to a communication apparatus and a reminder apparatus which are suitable for securely managing private information, such as a password for utilizing a server apparatus, and a nontransitory information recording medium recording a program for allowing a computer to realize the apparatuses.

BACKGROUND ART

Heretofore, various server apparatuses that users can start using by inputting their passwords have been proposed. In case of utilizing a plurality of such server apparatuses, it is desirable to use different passwords for respective services in order to enhance security. It is however troublesome for a user to memorize multiple passwords himself or herself; according to the technique disclosed in Patent Literature 1, a storage medium from which passwords for individual services becomes available with a single master password input.

PRIOR ART LITERATURE

Patent Literature

Patent Literature 1: Unexamined Japanese Patent Application Kokai Publication No. 2004-280245

PROBLEMS TO BE SOLVED BY THE INVENTION

Because such a storage medium permits passwords for individual services to be read out, however, the use of the storage medium in an Internet Cafe or the like would lower security. There arises another problem such that if the storage medium is lost, the passwords for individual services may not be remembered.

Meanwhile, various communication apparatuses accessible over the Internet, such as a router unit to realize a home LAN (Local Area Network), are set up in individual homes at present. Further, a lot of multifarious communication apparatuses including personal computers as well as cellular phones, smartphones and the like, which are connectable to the Internet are provided. Many of those communication apparatuses have communication capabilities and computation capabilities which match the capability of home routers.

In this respect, there is a strong demand to use those communication apparatuses to securely provide a server apparatus with individual passwords of a user and to enable password management to permit the user to use the passwords without carrying a storage medium storing the passwords.

Accordingly, in order to solve the above problems, it is an object of the present invention to provide a communication apparatus and a reminder apparatus which are suitable for securely managing private information, such as a password for utilizing a server apparatus, and a nontransitory information recording medium recording a program for allowing a computer to realize the apparatuses.

MEANS FOR SOLVING THE PROBLEM

In order to solve the above problems, the following subject matters are disclosed according to the principle of the invention.

A communication apparatus according to a first aspect of the invention is configured to include:

a storage that stores server names and a password table having a predetermined number of rows and a predetermined number of columns in association with each other;

a receiver that receives an authentication request specifying a server name;

a generator that generates a random table having the predetermined number of rows and the predetermined number of columns;

a presenter that presents the generated random table to a user;

an acceptor that accepts from the user a key obtained by selecting and arranging elements in the presented random table in a selection order associated with the user;

an identification unit that identifies the selection order associated with the user base on the accepted key and the generated random table;

an acquirer that acquires a password from a column of elements obtained by selecting elements included in the password table, stored in the storage in association with the server name specified in the authentication request, from the password table in the identified selection order, and arranging the elements in the identified selection order; and an output unit that outputs the acquired password as a password for allowing the user to use a server apparatus with the server name specified in the authentication request.

In the communication apparatus according to the invention, the server apparatus with the server name specified in the authentication request may be configured to determine whether the server apparatus is available to the user based on a time-synchronous one-time password, and the acquirer may be configured to acquire, as the password, a result of applying a predetermined one-way function to a seed including the obtained column of elements and a current time.

In the communication apparatus according to the invention, the acquirer may be configured to acquire the obtained column of elements as the password.

In the communication apparatus according to the invention, the output unit may be configured to output the acquired password by displaying the acquired password to the user.

In the communication apparatus according to the invention, the output unit may be configured to output the acquired password by sending a use request specifying the acquired password to the server apparatus with the server name specified in the authentication request.

In the communication apparatus according to the invention, the receiver may be configured to receive the authentication request from a first terminal used by the user, the presenter may be configured to present the generated random table to a second terminal used by the user, the acceptor may be configured to accept the key from the first terminal, and the output unit may be configured to send the use request to permit the user to use the server apparatus through the first terminal.

In the communication apparatus according to the invention, the receiver may be configured to receive the authentication request from a first terminal used by the user, the presenter may be configured to present the generated random table to the first terminal used by the user, the acceptor may be configured to accept the key from a second terminal, and the output unit may be configured to send the use request to permit the user to use the server apparatus through the first terminal.

The communication apparatus according to the invention may be configured to further include an updater that, when the password table associated with the server name specified in the authentication request is not stored in the storage, updates the storage by generating a new password table having the predetermined number of rows and the predetermined number of columns, setting individual elements in the new password table, and storing the new password table in the storage in association with the server name, the output unit may be configured to send the use request to the server apparatus with the server name specified in the authentication request to register the user in the server apparatus.

The communication apparatus may be configured to further include an updater that, when the password table associated with the server name specified in the authentication request is not stored in the storage, updates the storage by generating a new password table having the predetermined number of rows and the predetermined number of columns, accepting an input of a password from the user, dividing the accepted password into segments to be stored in elements in the identified selection order in the new password table, setting other elements at random, and storing the new password table in the storage in association with the server name.

The communication apparatus according to the invention from which components associated with a server name and components associated with communications are omitted serve as a reminder apparatus that reminds various kinds of private information including a password and a seed.

In a computer readable nontransitory information recording medium according to another aspect of the invention, a program which is recorded on the information recording medium is configured to permit a computer to function as the individual components of the communication apparatus or the reminder apparatus.

More generally, the key used in the foregoing communication apparatus or reminder apparatus can be considered to be information which is associated with the user's selection order of selecting elements in a password table or a private information table. That is, if the selection order can be uniquely derived from the key, the random table should not necessarily be used.

The program may be recorded on a computer readable nontransitory information recording medium such as a compact disk, a flexible disk, a hard disk, a magneto-optical disk, a digital video disk, a magnetic tape, a semiconductor memory or a RAM (Random Access Memory) in operation.

The program may be distributed and sold over a signal line in a computer communication network, that is, a temporary signal medium, independently of a computer on which the program is run. In addition, the information recording medium may be distributed and sold independently of a computer.

EFFECTS OF THE INVENTION

The invention can provide a communication apparatus and a reminder apparatus which are suitable for securely managing private information, such as a password for utilizing a server apparatus, and a nontransitory information recording medium recording a program for allowing a computer to realize the apparatuses.

BRIEF DESCRIPTION OF DRAWINGS

FIG. 3 is an explanatory diagram illustrating an example of a password table for a server name of a user;

FIG. 4 is an explanatory diagram illustrating an example of a random table for a server name of a user;

FIG. 6 is an explanatory diagram illustrating how communication according to another example of the embodiment is carried out.

MODE FOR CARRYING OUT THE INVENTION

While the following describes an embodiment according to the present invention, the embodiment to be described below is given by way of illustration only, and does not limit the scope of the invention. Therefore, those skilled in the art can employ embodiments in which the individual components or all the components are replaced with equivalent ones, and which are also encompassed in the scope of the invention.

First Embodiment

Figure 1:
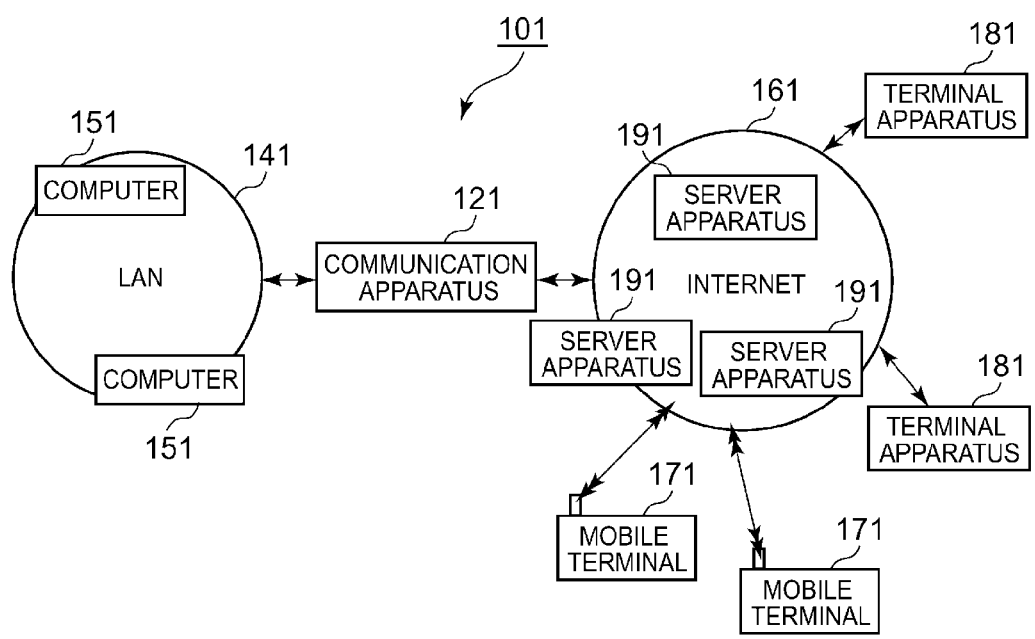
FIG. 1 is an explanatory diagram illustrating the schematic configurations of a communication apparatus according to an embodiment of the invention and various devices which are connected thereto.

FIG. 1 is an explanatory diagram illustrating the schematic configuration of a communication system including a communication apparatus according to an embodiment of the invention. A description is given below referring to FIG. 1.

In a communication system 101, a communication apparatus 121 functions as a router that relays communication between a LAN 141 and an Internet 161.

A user can access the Internet 161 via the communication apparatus 121 from a computer 151 in the LAN 141, and can access the communication apparatus 121 from the Internet 161.

Schemes of accessing the communication apparatus 121 from the Internet 161 include a scheme of using a terminal apparatus 181 which is installed in such as an Internet Cafe other than the LAN 141, and used by unspecified multiple users, as well as a scheme of using a mobile terminal 171 such as a cellular phone or a smartphone owned by a user.

The Internet 161 is connected with various kinds of server apparatuses 191. According to the embodiment, when a user tries to use the server apparatus 191 through a computer 151 in the LAN 141 or a terminal apparatus 181 within an external network such as an Internet Cafe, a password of the user is transferred to the server apparatus 191 using the communication apparatus 121.

The communication apparatus 121 according to the embodiment is realized by a computer for a router on which a predetermined program runs.

A typical computer for a router uses, under control of a CPU (Central Processing Unit), a RAM as a temporary memory area and an EEPROM (Electrically Erasable Programmable Read Only Memory) or HD (Hard Disk) as a non-volatile memory area, and uses two NICs (Network Interface Cards) to communicate with the Internet 161 or the computer 151 within the LAN 141. The CPU refers to the RAM and EEPROM, HD or the like, or uses the NICs to perform processes such as acquisition and provision of various kinds of data, and computations.

When the computer for a router has a capability of a wireless router, one of the two NICs serves as an access point of a wireless LAN to relay communication with the computer 151 within the LAN 141 and the Internet 161.

At the time of accessing the computer for a router from the Internet 161, it is possible to use a fixed host name and a fixed global IP (Internet Protocol) address that are assigned to the computer for a router, or a fixed host name and a dynamic global IP address that are provided by a DDNS (Dynamic Domain Name System).

The computer for a router is accessed via a browser or the like on another computer within the LAN 141 or receives an instruction via a keyboard, a mouse or the like which is connected to the computer for a router to execute various maintenances.

The program is recorded on the HD or EEPROM and is read out into the RAM to be executed. The distribution of the program is realized by downloading the program via the NIC from another device in the Internet or by using a DVD-ROM (Digital Versatile Disk ROM).

Fundamental Configuration of Communication Apparatus

Figure 2:
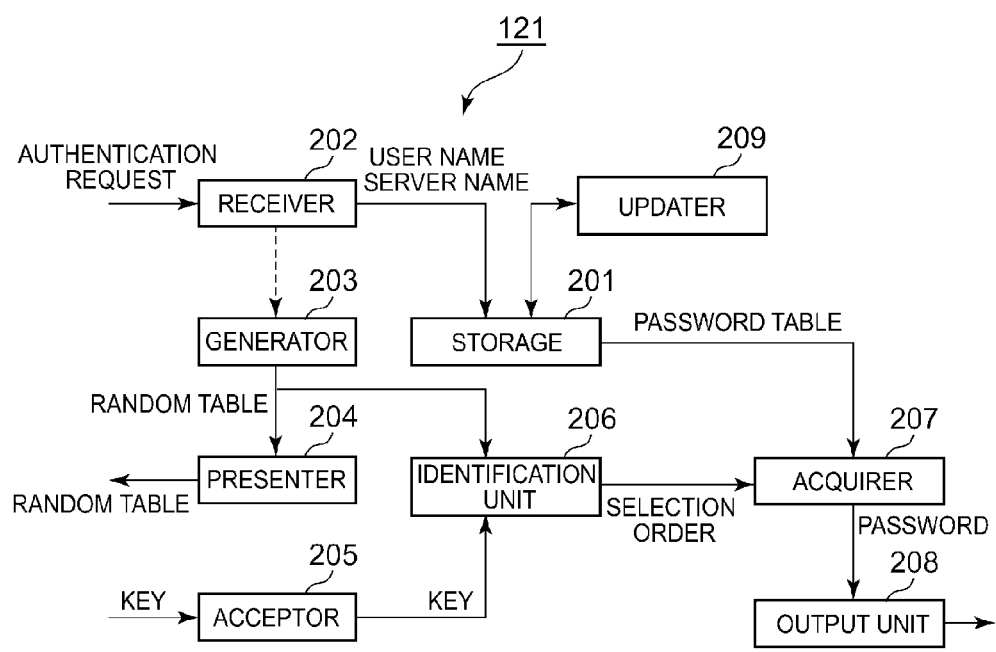
FIG. 2 is an explanatory diagram illustrating the schematic configurations of the communication apparatus according to the embodiment.

FIG. 2 is an explanatory diagram illustrating the schematic configurations of the communication apparatus 121 according to the embodiment. The following description is given referring to FIG. 2.

The communication apparatus 121 includes a storage 201, a receiver 202, a generator 203, a presenter 204, an acceptor 205, an identification unit 206, an acquirer 207, an output unit 208, and an updater 209.

While the communication apparatus 121 generally manages passwords of a plurality of users, the following describes management of information on a specific single user for the ease of understanding. By way of executing similar processing for each of a plurality of users, the communication apparatus 121 can manage the passwords of those users. In a case where a plurality of users use the communication apparatus 121, identification information such as server names of the users and unique ID numbers of the computers 151 or the mobile terminals 171 that are used by the users are specified in exchanging various kinds of information.

An selection order for selecting a predetermined number of elements from elements in a table having a predetermined number of rows and a predetermined number of columns is assigned to a user whose password is managed by the communication apparatus 121. This selection order is used in authenticating the user.

(Password Table)

A server name and a password table having a predetermined number of rows and a predetermined number of columns are stored in the storage 201 in association with each other. The storage 201 is realized by an EEPROM or HD according to the embodiment.

The server name is the name of the server apparatus 191 available to the user, and the domain name or IP address of the server apparatus 191 is used as such according to the embodiment.

FIG. 3 is an explanatory diagram illustrating an example of a password table for a server name of a user. The following description is given referring to FIG. 3.

A password table 301 illustrated in FIG. 3 includes twenty-five elements 302 in five rows by five columns. Three random alphanumeric characters are embedded in each of the elements 302 in the password table 301. To express each element in the password table 301, a lower-case alphabet is suffixed to the end of numeral "302," and a numeral without such a suffix means a generic name.

As mentioned above, a selection order of sequentially selecting a certain number of elements from the 5 by 5 table is assigned to the user of the password table 301. It is assumed herein that a selection order of "first selecting the first row and the first column, then selecting the second row and the fifth column, and finally selecting the fourth row and the second column" is assigned to the user.

According to the embodiment, an actual password for the server name of the user is obtained as "Lmja8i6zh" by coupling three characters "Lmj" of an element 302a of the first row and the first column in the password table 301, three characters "a8i" of an element 302 of the second row and the fifth column in the password table 301, and three characters "6zh" of an element 302c of the fourth row and the second column in the password table 301.

Random alphanumeric characters are embedded in the elements 302 in the password table 301 which are not included in the selection order. Even if the communication apparatus 121 is cracked or hacked and the password table 301 is entirely leaked, the actual password of the user for the server name is not immediately detected by the cracker or hacker. This is one of the features of the embodiment.

According to the embodiment, when a user attempts to use the server apparatus 191, the user sends an authentication request specifying the server name of the server apparatus 191 from a computer 151 within the LAN 141 or a terminal apparatus 181 or the like outside the LAN 141, which is involved in the use of the server apparatus 191.

Then, the receiver 202 receives the authentication request specifying the server name. Therefore, the NIC serves as the receiver 202 under control of the CPU.

(Random Table)

Upon reception of the authentication request, the generator 203 generates a random table having the same number of rows and the same number of columns as the password table 301 stored in the storage 201 for the server name specified in the authentication request of the user. According to the embodiment, the CPU executes this generation process.

FIG. 4 is an explanatory diagram illustrating an example of a random table for a server name of a user.

A random table 401 illustrated in FIG. 4 has the same number of rows and the same number of columns as the password table 301, i.e., a 5 by 5 table, and two random numerals are embedded in each of elements 402 in the random table 401. The numerals embedded in the individual elements 402 differ from one another.

The random table 401 generated by this way is presented to the user by the presenter 204. For example, the CPU in the computer for a router carries out this presentation process by instructing the computer 151 within the LAN 141 or the terminal apparatus 181 outside the LAN 141, which the user attempts to use in accessing the server apparatus 191, by means of the NIC to display the random table 401 on the monitor screen.

The user presented with the random table 401 makes selection from the elements 402 in the random table 401 according to the user's own selection order. According to the above example, a two-digit numeral "13" in an element 402a of the first row and the first column in the random table 401, a two-digit numeral "02" in an element 402b of the second row and the fifth column in the random table 401 and a two-digit numeral "31" in an element 402c of the fourth row and the second column in the random table 401.

Then, the user sends a key comprised of a six-digit numeral "130231" obtained by coupling those numerals to the communication apparatus 121 from the mobile terminal 171 or the like the user owns.

The acceptor 205 in the communication apparatus 121 accepts this key "130231" from the user. Therefore, the NIC serves as the acceptor 205 under control of the CPU.

Further, the identification unit 206 identifies the selection order associated with the user from the accepted key and the generated random table 401.

In this example, the accepted key is separated two digits by two digits to obtain "13", "02" and "31". Since the individual elements 402 in the random table 401 differ from one another, the user's selection order is identified as "first selecting the first row and the first column, then selecting the second row and the fifth column, and finally selecting the fourth row and the second column" by searching the individual elements 402 in the random table 401 for those three two-digit numerals.

As another possible mode, a graphical image may be put in each element in the random table 401 or each element may be set blank. In this mode, a user may be permitted to input a row number and a column number of each element in the random table 401.

Moreover, another mode may be taken such that pictures are displayed in the individual elements in the random table 401, and random numerals which are not displayed are assigned to the respective elements, so that when a user specifies a picture, the numeral assigned to the element for the picture is selected.

That is, a table having the same number of rows and the same number of columns as the random table 401 and having various pictures, symbols or illustrations disposed in the elements, not the random table 401 as shown in FIG. 4, is displayed on the screen.

Then, when the user specifies an element having a graphical image or the like drawn therein (for example, when the screen is structured as a touch screen, the user should directly touch the element with a finger; alternatively, a scheme of moving a cursor on the screen using a keyboard or mouse and then operating a Set key or a mouse button to specify an element may be employed), the numeral in the random table 401 in FIG. 4 which is arranged at the same row and the same column as that element is selected.

This mode uses pictures or the like familiar with a user and thus brings about an effect of facilitating the user's selection in the random table 401.

Then, the acquirer 207 acquires the password of the user who wants to access the server apparatus 191 with the server name specified in the authentication request. That is, the acquirer 207 selects from the password table 301 three characters "Lmj" of the element 302a of the first row and the first column in the password table 301, three characters "a8i" of the element 302 of the second row and the fifth column in the password table 301, and three characters "6zh" of the element 302c of the fourth row and the second column in the password table 301 in the selection order identified in the foregoing manner, and coupling the characters to acquire the password "Lmja8i6zh." Therefore, the CPU cooperates with the EEPROM or HD to serve as the acquirer 207.

As apparent from the above, according to the embodiment, the selection order itself is not recorded in the communication apparatus 121. Even if the communication apparatus 121 is cracked and thus the entire password table 301 is leaked, the actual password of the user for the server name is not immediately detected by the cracker or hacker. This is one of the features of the embodiment.

The output unit 208 sends a use request specifying the acquired password to the server apparatus 191 with the server name specified in the authentication request, so that the user can utilize the server apparatus 191.

That is, the communication apparatus 121 serves as a proxy server for log-in to the server apparatus 191.

Even after the password is sent to the server apparatus 191 via the communication apparatus 121 from the computer 151 within the LAN 141 or the mobile terminal 171 such as a cellular phone, which is used by the user, and log-in is made successfully, the communication apparatus 121 for the server apparatus 191 may be continuously used as a proxy server, or the proxy of the communication apparatus 121 may be removed and communication may be carried out between the computer 151 within the LAN 141 or the mobile terminal 171 such as a cellular phone, and the server apparatus 191 as done according to the authentication technique of OpenID or the like.

Figure 5:
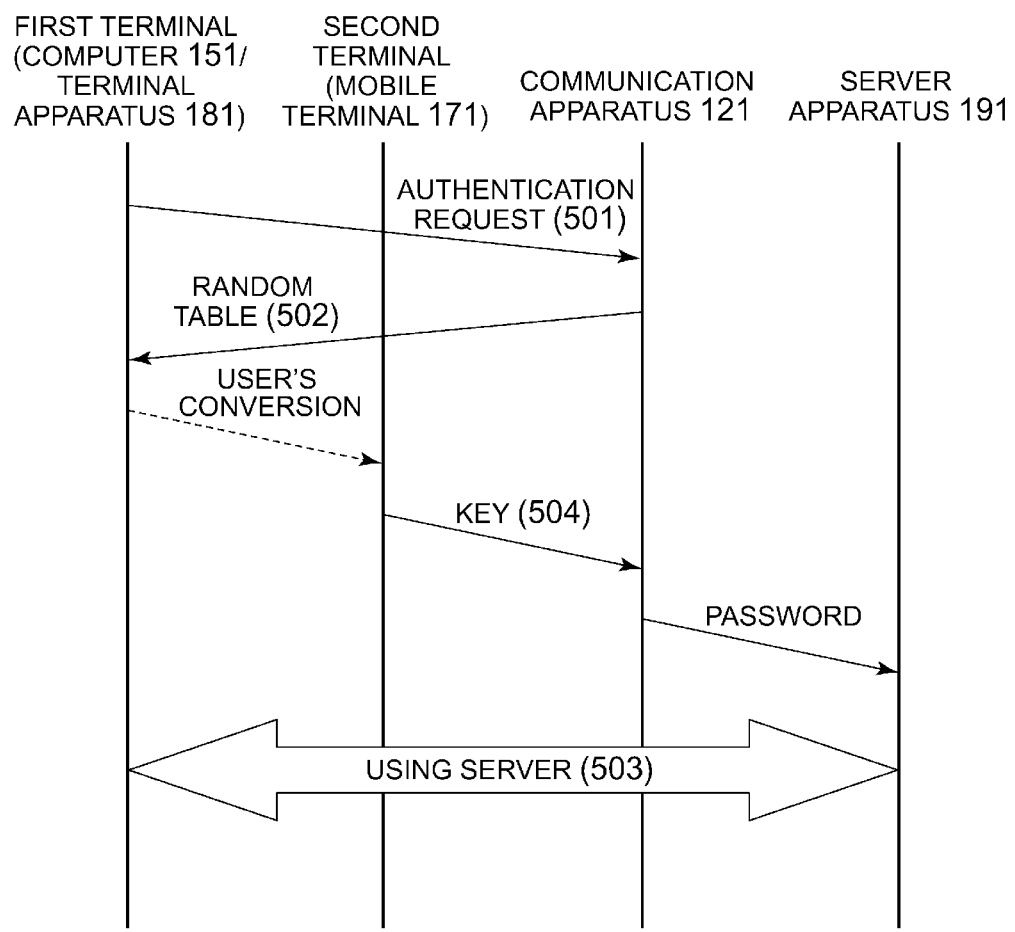
FIG. 5 is an explanatory diagram illustrating how communication according to one example of the embodiment is carried out.

FIG. 5 is an explanatory diagram illustrating how communication according to one example of the embodiment is carried out. The following description is given referring to FIG. 5.

As described above, according to the example, (1) the computer 151 within the LAN 141 or the terminal apparatus 181 outside the LAN 141 is adopted as a first terminal, and is used as a sender for transmission of an authentication request (501), a destination for presentation of the random table 401 (502) and one which uses the server apparatus 191 (503), and (2) the mobile terminal 171 is adopted as a second terminal, and is used as a sender of sending a key (504), so that a device on which the random table 401 is displayed is separated from a device for inputting the key.

According to the embodiment, the simplest mode is to input the user name of the user and the server name besides the key through the mobile terminal 171 such as a cellular phone.

In addition, it is possible to adopt a mode of managing the email address or short-message address of the mobile terminal 171 such as a cellular phone of the user in the storage 201, and informing URL (Universal Resource Locator) representing an input form to input a key to this session to permit the user to gain access using the browser of the mobile terminal 171 such as a cellular phone.

In addition, the presentation destination of the random table 401 and the sender of the key may be interchanged with each other. FIG. 6 is an explanatory diagram illustrating how communication according to another example of the embodiment is carried out. The following description is given referring to FIG. 6.

Specifically, (1) the computer 151 within the LAN 141 or the terminal apparatus 181 outside the LAN 141 is adopted as a first terminal, and is used as a sender for transmission of an authentication request (501), a sender of sending the key (504), and one which uses the server apparatus 191 (503), and (2) the mobile terminal 171 is adopted as a second terminal, and is used as a destination for presentation of the random table 401, so that a device on which the random table 401 is displayed is separated from a device for inputting the key.

According to the mode, a mode of managing the email address or short-message address of the mobile terminal 171 such as a cellular phone of the user may be managed in the storage 201, and the random table 401 may be presented in the form of description in the text of an email or a short message for this session this session, or a URL (Universal Resource Locator) representing an input form to display the random table 401 may be informed to permit the user to gain access using the browser of the mobile terminal 171 such as a cellular phone.

With those modes adopted, even if a cracker or hacker traces the display on the monitor screen of the terminal apparatus 181 or the history of operations on the keyboard for the terminal apparatus 181, the password for the server apparatus 191 is not leaked. Therefore, security can be improved significantly.

In addition, when and only when the server apparatus 191 is accessed through the communication apparatus 121 from the computer 151 within the LAN 141, the computer 151 within the LAN 141 may be allowed to serve as the sender of the authentication request, the presentation destination of the random table 401 and one which uses the server apparatus 191 sending the key.

This is because with the communication apparatus 121 serving as a router for a home LAN, it is considered that the computer 151 within the LAN 141 has a high reliability even when those pieces of information are exchanged thereover.

Of course, even the computer 151 within the LAN 141 accesses the server apparatus 191 through the communication apparatus 121, a mode of separating the first terminal from the second terminal as mentioned above may be adopted.

Further, at the time of making the authentication, the communication apparatus 121 may also check information for identifying a user, such as a user name and the ID number of the mobile terminal 171 such as a cellular phone.

The number of rows and the number of columns in the password table 301, and the length of a string of characters included in each element 302 are not limited to those mentioned above, and may be changed variously. In general, a plurality of password tables 301 for various server apparatuses 191 are prepared for a single user, so that the number of rows and the number of columns are common in those password tables 301. Moreover, the length of a character string in each element 302 is determined by the length of a password needed for the server apparatus 191 for the password table 301, and the number of elements 302 to be selected based on the user's selection order.

While the number of rows and the number of columns of the random table 401 should be common to those of the password table 301, the type and length of a character string included in each element 402 may be varied as needed. In order to permit a user's selection order to be obtained from the random table 401 and the key, the random table 401 is generally structured so that each character string in every element 402 has a common length and the elements 402 differ from one another.

A character string included in each element 302 in the password table 301 and a character string included in each element 402 in the random table 401 may be used as prefix codes, so that those character strings may have variable lengths. That is, those tables should be structured at random in such a way that each character string in an element in the table has such a property as not to be a prefix of the character string in any one of the other elements in the table. The use of prefix codes permits the selection order to be uniquely restored from the key.

According to the embodiment, the output unit 208 outputs a password by sending a use request specifying the password to the server apparatus 191.

In addition, when the first terminal (computer 151 or terminal apparatus 181) and the second terminal (mobile terminal 171) are configured integral with the communication apparatus 121, the communication apparatus 121 serves as a password reminder.

Typically, the communication apparatus 121 in this mode includes an input unit such as a keyboard or touch panel, and a display unit such as a display, and is realized by a cellular phone, smartphone or the like which has a communication capability to be connectable to the Internet 161.

According to the mode, the authentication request is given by the user via the input unit of the communication apparatus 121 (501).

The random table is displayed on the display unit (502) to be presented to the user.

The user performs conversion on the displayed random table to provide the communication apparatus 121 with a key via the input unit (504).

Then, the output unit 208 of the communication apparatus 121 displays the acquired password on the display unit to inform the user of the password for the desired server apparatus.

According to the password reminder of the mode, a password is not directly stored in the storage 201, so that even if a smartphone or the like constituting the communication apparatus 121 is stolen, the password is not immediately leaked.

Because a rule for conversion by a user is not recorded in the communication apparatus 121, when a third party has obtained the smartphone or the like and attempts an illegal use thereof, the risk is low of making the "password" displayed on the display unit actually available on the server apparatus.

Various modes of the password reminder based on the principle of the invention will be further described in the description of a third embodiment to be discussed later.

(New Registration in Server Apparatus)

Although the foregoing description is premised on a situation where the password table 301 is already stored in the storage 201, the following describes a scheme to newly generate a password table 301 for a user for a server apparatus 191 with a certain server name.

That is, when a password table which is associated with the server name specified in the authentication request is not stored in the storage 201, the updater 209 generates a new password table having a predetermined number of rows and a predetermined number of columns, and stores the new password table in the storage 201 so as to update the storage 201

The length of a character string (the number of characters) determined for each element 302 of the new password table 301 and the type of the characters are determined according to specification data of the user's selection order and the type of a password which is allowed by the corresponding server apparatus 191.

When N elements 302 are selected according to the user's selection order, and the length of the password for the server apparatus 191 is M characters, the length, L, of a character string to be stored in each element 302 is determined to satisfy $$Lx(N-1)<M \leq LxN.$$

In a system in which the length of a password should be required to be within a certain range, it is desirable to set M and L so that the equality holds in the inequality expression.

When the length of a password is fixed and the expression with the equality in the inequality expression is not fulfilled, the following scheme may be adopted.

(1) A scheme of storing the length, M, of a password in addition to the password table 301 in association with the server name. According to the scheme, any M characters are regularly extracted from a character string of LxN characters obtained according to the selection order, and are used as a password. A specific rule is to extract top an M characters or extract a last M characters. There is another scheme of adopting the Bresenham's line algorithm to draw a line with a slope of M over LxN using only addition and subtraction of integers to thereby extract a single character every time an error counter is carried up.

(2) A scheme of obtaining a password when a character which cannot be used by the server apparatus 191 is inserted as appropriate, and deleting this unusable character from a character string of LxN characters. For example, in general, ASCII characters with character codes 32 to 127 are available for an ordinary password, and a Tab character and a line feed character may not be available. According to this scheme, therefore, those unavailable characters are inserted in the individual elements 302 at random. It is desirable that the individual elements 302 should be set at random in such a way that the ratio of the number of characters in the entire elements 302 in the password table 301 to the number of available characters which appear in the entire elements 302 in the password table 301 matches with M/LxN as much as possible.

After a new password table 301 for the user for the server name is generated and then stored in the storage 201 this way, the output unit 208 sends a use request to the server apparatus 191 with the server name specified in the authentication request to register the user in the server apparatus 191.

That is, when obtaining a password from the stored password table 301 in the above manner, the output unit 208 sends this password to the server apparatus 191 as a "password for a user registered as a user for the server apparatus 191 to log in."

When obtaining a password from the password table 301 which has been newly generated by the updater 209 and has just been stored in the storage 201, on the other hand, the output unit 208 sends this password to the server apparatus 191 as a "log-in password for newly registering a user who is not registered as a user for the server apparatus 191".

This mode is useful even when a password in the server apparatus 191 has an expiration period and needs to be changed. That is, the acquirer 207 obtains an old password from an existing password table 301 and obtains a new password from a newly generated password table 301, and the output unit 208 sends both passwords to the server apparatus 191 to update the password.

According to the mode, a user need not consider a password which is hardly imaginable by a third party and is easy to remember. This is because the password of the user for the server apparatus 191 is generated at random, and is hardly imaginable by any one. Therefore, security of a password for the server apparatus 191 can be enhanced more as compared with the case where a user selects a password himself/herself.

Although the communication apparatus 121 according to the embodiment is installed on a computer for a router most typically, the communication apparatus 121 should not necessarily function as a router. For example, the communication apparatus 121 can be realized by a computer that serves as a proxy for the server apparatus 191 in some mode, which is encompassed in the scope of the invention.

Second Embodiment

The foregoing embodiment may be carried out on the assumption that a user registration is newly made to the server apparatus 191, whereas the embodiment set forth below may cope with a case where a user registration has been made to the server apparatus 191 and further a his/her password has already been set.

In this case, a password table associated with the server name specified in the authentication request is not stored in the storage 201.

Thus, as in the first embodiment, the updater 209 generates a new password table 301 having a predetermined number of rows and a predetermined number of columns, and stores the new password table 301 in the storage 201 in association with the server name, thereby updating the storage 201.

It is noted however that the embodiments slightly differ from each other in how a character string to be embedded in each element 302 in the password table 301 is formed.

Specifically, the updater 209 accepts an input of a password from the user to the server apparatus 191. From the viewpoint of enhancing security, it is desirable that the device the user uses to input the password be limited to a computer 151 within the LAN 141.

The user inputs a user name and a server name via the computer 151 within the LAN 141, and an authentication request specifying the user name and the server name is sent to the server apparatus 191 via the computer 151. Then, the updater 209 of the communication apparatus 121 requests the computer 151 to cause the user to input the password for the server apparatus 191, and accepts the password sent from the computer 151.

There is another mode in which a user inputs a password in addition to a user name and a server name. In this case, the password for the server apparatus 191 is added as additional information for an authentication request. The updater 209 accepts the password added to the authentication request.

Then, generation and presentation of the random table 401, input of a key by the user, and identification of the user's selection order are carried out in the same way as the first embodiment.

When an existing password for the server apparatus 191 is obtained this way, the existing password is separated into segments equal in number to the elements to be selected according to the selection order. When the lengths of segments are not constant, the length of the password itself is saved in the storage 201 or a line feed character or the like is embedded in the password to adjust the length.

Then, the updater 209 sequentially stores the segments, obtained by separating the password, into the elements in the password table 301 according to the identified selection order.

Thereafter, random character strings equal in length to the segments of the password are generated and embedded in those individual elements 302 in the password table 301 which are not associated with the selection order. In this case, random character strings are generated according to the frequencies of appearance of the types of characters appearing in the password, such as an alphabet letter, numeral or symbol, and an inserted line feed character or the like, so that even if the password table 301 is leaked, it is possible to prevent a third party from predicting the password.

Third Embodiment

The aforementioned communication apparatus 121 manages the password table 301 associated with a user and a server name. In addition, even when the password table 301 is directly displayed on the screen, the password of the user for the server apparatus 191 is not immediately recognized. The password for the password table 301 is not obtained unless the user's selection order and the password table 301 are both acquired.

Therefore, when the user accesses the communication apparatus 121 via the computer 151 within the LAN 141 and requests a password table 301 to be associated with the user and the server name, the communication apparatus 121

(a) displays the password table 301 on the screen of the computer 151 within the LAN 141 in response to the computer 151 within the LAN 141, or (b) sends an email describing the password table 301 to the email address of the mobile terminal 171 such as a cellular phone, or the like, which has been set for the user in advance, so that a so-called password reminder can be realized.

In addition, there may be a mode in which when a mobile terminal 171 such as a cellular phone request a password table 301 to be associated with a user and a server name, the communication apparatus 121 checks the ID number of the mobile terminal 171 such as a cellular phone, and sends an email describing the password table 301 to an email address associated with the mobile terminal 171 such as a cellular phone.

That is, although the communication apparatus 121 sends the random table 401 to the mobile terminal 171 according to the above embodiment, the communication apparatus 121 can be allowed to send the password table 301 to the mobile terminal 171 upon successful authentication of the communication apparatus 121 (normal password-based authentication may be adopted, or authentication using a random table and a selection order may be adopted, as in the foregoing example, so that the selection order itself serves as a password).

Some general browsers store a password for a certain site to be prepared for a next log-in. The browser with such a capability often provides a function of displaying a password itself on the screen, whereas a password itself is not directly displayed on the screen according to the embodiment.

Therefore, a temperature reminder safer than the conventional type can be realized.

Fourth Embodiment

According to the embodiment, a string of elements obtained by arranging the elements 302 in a password table 301 is used directly as a password for utilizing the server apparatus 191.

According to the embodiment, a string of elements obtained by arranging elements 302 selected from a password table 301 based on a rule assigned to the user is used as a seed for a one-time password. The following first describes a conventional time-synchronous one-time password system.

In the conventional system, each user is provided with an electronic device called "token."

A seed assigned to the user is recorded in the token in a non-volatile manner. In general, a seed is a string of characters and/or a string of numerals.

With regard to a token, a current time (typically expressed in terms of an elapsed time from a specific reference time) is acquired by referring to a real-time clock or the like, a predetermined one-way function is applied to the acquired current time and the seed stored in a non-volatile manner to compute a string of characters or a string of numerals (6-digit numeral string in a system which is popular today), thereby providing a one-time password, which is in turn displayed on a liquid crystal display.

On the other hand, the server apparatus is designed to be able to compute a one-time password for each user from the seed assigned to each user and the current time by applying the predetermined one-way function thereto.

Accordingly, the server apparatus carries out authentication by checking if the combination of the user name and the one-time password both sent from a terminal apparatus matches with one-time password which is computed from the combination of the seed for the user and the current time.

According to the embodiment, in such a one-time password system, a user does not carry around an exclusive token, but the invention is used to prevent a seed from being leaked at the time of using a cellular phone, a smartphone, a mobile computer or the like as a token.

According to the embodiment, the seed for the user is divided into segments based on the user's rule, the segments are embedded into elements in the password table 301 to be stored in the storage 201 which are based on the user's rule, and random strings with substantially the same lengths are embedded in the other elements.

The receiver 202 of the communication apparatus 121 accepts an authentication request issued based on a keyboard operation or a touch-panel operation by the user via a signal line of an electronic circuit of this hardware.

The generator 203 generates a random table 401 as done in the foregoing embodiment. The presenter 204 displays the generated random table 401 on the display provided on the communication apparatus 121.

The acceptor 205 accepts a key input based on a keyboard operation or a touch-panel operation by the use, and the identification unit 206 identifies the user's conversion rule based on the random table 401 and the key.

The acquirer 207 sequentially extracts elements in the password table 301 and arranging the elements based on the user's conversion rule, thereby acquiring a seed. Further, the acquirer 207 refers to the real-time clock or the like to acquire a current time. Then, the acquirer 207 applies a predetermined one-way function to the seed and the current time to compute a one-time password for the user.

The output unit 208 displays the computed one-time password on the display. The other structures can be set the same as those of the foregoing embodiment.

The invention can likewise be adapted to such a time-synchronous one-time password system even when the router or the like of the LAN 141 is used as the communication apparatus 121 according to the invention.

This embodiment may be reckoned as the foregoing embodiment in which a one-time password seed is used as the password for a user. According to the embodiment, as in the foregoing embodiment, the server apparatus of the conventional one-time password system can be used directly.

Fifth Embodiment

Although each of the communication apparatuses 121 can be realized by a computer having a communication capability, the communication apparatus 121 should not necessarily have the communication capability when the communication apparatus 121 is permitted to serve as a password reminder. That is, even under a situation where connection to the Internet 161 is not possible, the communication apparatus 121 can be permitted to serve as a password reminder by running a predetermined program on the computer 151, the mobile terminal 171, the terminal apparatus 181 or the like.

A password and a seed are information which should be confidential to a third party. Therefore, more generally speaking, the password reminder according to the embodiment can be regarded as a reminder for private information.

That is, with private information divided into a predetermined segments which are stored in the password table 301, the password reminder can serve as a reminder apparatus for various kinds of private information. Although the password table 301 according to this mode has a structure similar to that of the foregoing mode, the password table 301 serves as a private information table in which segments of various kinds of private information including a password are embedded.

To store plural kinds of private information in the reminder apparatus according to the embodiment, the type of necessary private information is identified based on information from the user accepted by the receiver 202. That is, the reminder apparatus according to the mode causes a user to input a name of the type of private information instead of a server name by means of the receiver 202.

When private information is limited to one type, the receiver 202 can be omitted. In this case, the generator 203 generates a random table regularly or based on an instruction from the user.

The output unit 208 may automatically provide private information as a password for various kinds of authentication functions on a computer which serves as the reminder apparatus, or may provide an external server apparatus with private information using the communication capability, besides the output to be displayed on the liquid crystal display.

As private information, various kinds of information such as the social security number, insurance number, credit card number and bank account number of a user, besides a password and a seed, can be stored in the reminder apparatus. Those pieces of private information may be simply divided into segments to be stored in the a private information table (password table 301), or another mode may be adopted in which private information may be encrypted and stored separately and a key for decrypting the encrypted private information is stored in the private information table (password table 301).

Note that more generally, the key in the communication apparatus 121 or the reminder apparatus can be considered as information to be associated with the user's selection order of selecting elements in the password table 301 or private information table. That is, if the selection order can be uniquely derived from the key, the random table 401 should not necessarily used.

For example, a mode in which the password table 301 is directly displayed on the screen may be adopted. Further, a mode in which the individual elements in the random table 401 are always fixed may be adopted.

This application claims priority based on Japanese Patent Application No. 2010-194234 filed on Aug. 31, 2010, the entire disclosure of which is incorporated herein by reference in its entirety as much as is permitted by the law of the designated country.

INDUSTRIAL APPLICABILITY

The present invention can provide a communication apparatus and a reminder apparatus which are suitable for securely managing private information, such as a password for utilizing a server apparatus, and a nontransitory information recording medium recording a program for allowing a computer to realize the apparatuses.

DESCRIPTION OF REFERENCE NUMERALS

101 Communication system
121 Communication apparatus
141 LAN
151 Computer
161 Internet
171 Mobile terminal
181 Terminal apparatus
191 Server apparatus
201 Storage
202 Receiver
203 Generator
204 Presenter
205 Acceptor
206 Identification unit
207 Acquirer
208 Output unit
209 Updater
301 Password table
302 Elements in password table
401 Random table
402 Elements in random table

What is claimed is:

1. A reminder apparatus comprising:
a processor,
a memory storing a program to be executed by the processor, and
a storage that stores a private information table in association with each of names of types of private information, wherein
the private information table has a predetermined number of rows and a predetermined number of columns,
the private information table is populated with private elements and non-private elements,
the private elements correspond to segments of private information that populate cells of the private information table, and
the non-private elements are placed in remaining unpopulated cells of the private information table,
wherein the program comprises:
a receiving code that causes the processor to receive a name;
a generating code that causes the processor to generate a random table having the predetermined number of rows and the predetermined number of columns;
a presenter code that causes the processor to present the generated random table to a user;
an accepting code that causes the processor to accept from the user a key wherein
the key comprises elements from the presented random table in a predetermined selection order made by the user, and
the predetermined selection order represents an ordered sequence corresponding to selected locations of the elements of the presented random table;

an identifying code that causes the processor to identify the predetermined selection order made by the user from the accepted key and the generated random table;

an updating code that, when a private information table associated with the received name is absent from the storage, causes the processor to generate a new private information table having the predetermined number of rows and the predetermined number of columns, obtain, from an input of the user, a new private information in association with the received name of the user, divide the obtained new private information in association with the received name of the user into segments to be stored as private elements in the predetermined selection order in the identified new private information table, populate the new private information table with the divided private elements according to the identified predetermined selection order, respectively, randomly populate remaining unpopulated cells of the new private information table with non-private elements, and store the new private information table into the storage in association with the received name;

an acquiring code that, when the private information table associated with the received name is stored in the storage, causes the processor to acquire private information by selecting private elements of the private information table in the identified selection order, and combining the selected private elements in the identified predetermined selection order; and an output code that causes the processor to output the acquired private information on a display that is viewed by the user, thereby allowing the user to use the processor.

2. The reminder apparatus of claim 1, wherein the generated random table presented to the user is presented through a first terminal, and the user inputs the key through a second terminal.

3. A reminder apparatus comprising:
a processor,
a memory storing a program to be executed by the processor, and
a storage that stores a private information table in association with each of names of types of private information, wherein
the private information table has a predetermined number of rows and a predetermined number of columns,
the private information table is populated with private elements and non-private elements,
the private elements correspond to segments of private information that populate cells of the private information table, and
the non-private elements are placed in remaining unpopulated cells of the private information table,
wherein the program comprises:
a receiving code that causes the processor to receive a name;
an accepting code that causes the processor to accept keys from the user wherein the keys represent a predetermined selection order made by the user;
an identifying code that causes the processor to identify the predetermined selection order made by the user from the accepted keys;

an updating code that, when a private information table associated with the received name is absent from the storage, causes the processor to generate a new private information table having the predetermined number of rows and the predetermined number of columns, obtain, from an input of the user, a new private information in association with the received name of the user, divide the obtained new private information in association with the received name of the user into segments to be stored as private elements in the identified predetermined selection order in the new private information table, populate the new private information table with the divided private elements according to the identified predetermined selection order, respectively, randomly populate remaining unpopulated cells of the new private information table with non-private elements, and store the new private information table into the storage in association with the received name;

an acquiring code that, when the private information table associated with the received name is stored in the storage, causes the processor to acquire private information by selecting private elements of the private information table in the identified selection order, and combining the selected private elements in the identified predetermined selection order; and an output code that causes the processor to output the acquired private information on a display that is viewed by the user, thereby allowing the user to use the processor.

4. The reminder apparatus according to claim 3, wherein the output code further causes the processor to send the acquired private information to a server associated with the received name.

5. A reminding method with a storage that stores a private information table in association with each of names of types of private information, wherein
the private information table has a predetermined number of rows and a predetermined number of columns,
the private information table is populated with private elements and non-private elements,
the private elements correspond to segments of private information that populate cells of the private information table, and
the non-private elements are placed in remaining unpopulated cells of the private information table,
the reminding method comprising:
receiving a name;
accepting keys from the user wherein the keys represent a predetermined selection order made by the user;
identifying the predetermined selection order made by the user from the accepted keys;
when a private information table associated with the received name is absent from the storage,
generating a new private information table having the predetermined number of rows and the predetermined number of columns,
obtaining, from an input of the user, a new private information in association with the received name of the user, dividing the obtained new private information in association with the received name of the user into segments to be stored as private elements in the identified predetermined selection order in the new private information table, populating the new private information table with the divided private elements according to the identified predetermined selection order, respectively, randomly populating remaining unpopulated cells of the new private information table with non-private elements, and storing the new private information table into the storage in association with the received name;

acquiring, when the private information table associated with the received name is stored in the storage, private information by selecting private elements of the private information table in the identified selection order, and combining the selected private elements in the identified predetermined selection order; and outputting the acquired private information on a display that is viewed by the user, thereby allowing the user to use the private information.

6. A non-transitory computer-readable information recording medium storing a program controlling a storage to store a private information table in association with each of names of types of private information, wherein the private information table has a predetermined number of rows and a predetermined number of columns, the private information table is populated with private elements and non-private elements, the private elements correspond to segments of private information that populate cells of the private information table, and the non-private elements are placed in remaining unpopulated cells of the private information table, the program controlling the processor to
receive a name;

accept keys from the user wherein the keys represent a predetermined selection order made by the user;

identify the predetermined selection order made by the user from the accepted keys;

when a private information table associated with the received name is absent from the storage, generate a new private information table having the predetermined number of rows and the predetermined number of columns, obtain, from an input of the user, a new private information in association with the received name of the user, divide the obtained new private information in association with the received name of the user into segments to be stored as private elements in the identified predetermined selection order in the new private information table, populate the new private information table with the divided private elements according to the identified predetermined selection order, respectively, randomly populate remaining unpopulated cells of the new private information table with non-private elements, and store the new private information table into the storage in association with the received name;

acquire, when the private information table associated with the received name is stored in the storage, private information by selecting private elements of the private information table in the identified selection order, and combining the selected private elements in the identified predetermined selection order; and output the acquired private information on a display that is viewed by the user, thereby allowing the user to use the private information.

\* \* \* \* \*